United States Patent [19]
Anderson et al.

[11] 3,879,449
[45] Apr. 22, 1975

[54] 1-PHENYL-4-HYDROXY-1-BUTEN-3-ONES AND ESTERS THEREOF

[75] Inventors: Paul L. Anderson, Dover, N.J.; Darryl A. Brittain, New York, N.Y.

[73] Assignee: Sandoz-Wander, Inc., Hanover, N.J.

[22] Filed: Mar. 4, 1974

[21] Appl. No.: 447,967

[52] U.S. Cl. ..... 260/488 CD; 260/345.9; 260/342.8; 260/590; 260/618 D; 260/618 E; 424/311; 424/331
[51] Int. Cl. ...................... C07c 69/14; C07c 69/24
[58] Field of Search ........... 260/488 CD, 590, 410.5

[56] References Cited
OTHER PUBLICATIONS

Chem. Abstracts, 23:831.
Chem. Abstracts, 69:106118j.

*Primary Examiner*—Vivian Garner
*Attorney, Agent, or Firm*—Gerald D. Sharkin; Richard E. Vila; Frederick H. Weinfeldt

[57] ABSTRACT

The compounds are 1-phenyl-1-buten-4-ol-3-ones and their esters, e.g., 2-(p-biphenylyl)-2-penten-5-ol-4-one, and are useful as pharmaceuticals, e.g., anti-inflammatory agents.

11 Claims, No Drawings

1-PHENYL-4-HYDROXY-1-BUTEN-3-ONES AND ESTERS THEREOF

This invention relates to hydroxy ketones and their esters, and more particularly to 1-phenyl-1-buten-4-ol-3-ones and their esters, and to the preparation of such compounds, as well as to pharmaceutical compositions containing such compounds and the use of such compounds.

The compounds of this invention may be conveniently represented by the formula I:

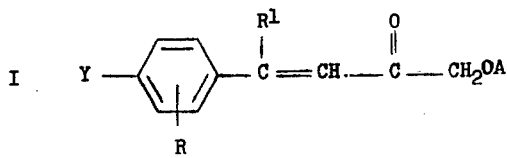

wherein
- R is a hydrogen atom or halo having an atomic weight of from about 19 to 80, i.e., fluoro, chloro or bromo;
- $R^1$ is lower alkyl, e.g., having from 1 to 3 carbon atoms, such as methyl, ethyl, isopropyl or n-propyl preferably methyl;
- Y is halo having an atomic weight of from about 34 to 80, i.e., chloro or bromo, isobutyl, tert.-butyl; or

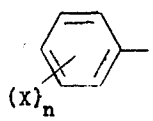

wherein
- X is a hydrogen atom, or halo having an atomic weight of from about 19 to 80, i.e., fluoro, chloro or bromo, lower alkyl, e.g., having from 1 to 4 carbon atoms; or lower alkoxy having from 1 to 4 carbon atoms;
- n is an integer from 1 to 3, preferably n is 1 or 2; and
- A is a hydrogen atom or lower alkanoyl, e.g., having from 2 to 4 carbon atoms, such as acetyl, propionyl or butyroyl, including isomers where such exist, but are preferably unbranched.

The lower alkyl and lower alkoxy groups as X are understood to include as the alkyl portions thereof methyl, ethyl, propyl and butyl, including isomeric forms where such exit.

Accordingly, Compounds I can be defined as consisting of two sub-classes depending upon the nature of A, i.e., Compounds Ia, when A is a hydrogen, i.e., alcohols; and Compounds Ib, when A is alkanoyl, i.e., esters, as may be represented by the following structures wherein Y, R and $R^1$ are defined above, and A′ is A when it is lower alkanoyl as defined above:

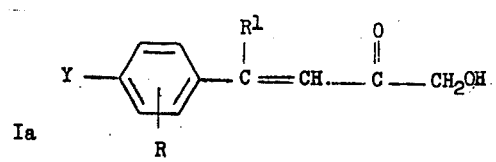

; and

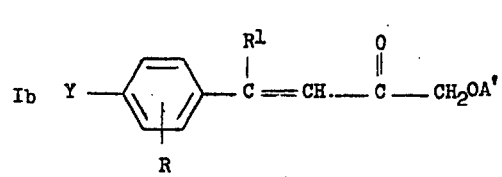

Compounds Ia, i.e., Compounds I in which A is a hydrogen atom, may be obtained by acidic treatment (Process a) of an appropriate butyndiol of the formula II

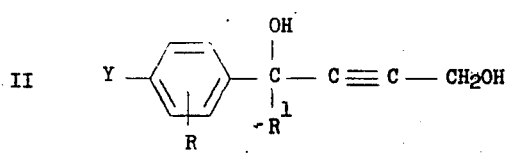

wherein R, Y and $R^1$ are as defined above,

Process (a) involves mild acidic treatment of a compound II to obtain the corresponding Compound Ia and may be carried out employing as the "acidic" source a protonating agent in a suitable medium, at moderate temperatures, e.g., 10° to 100°C., preferably at 60° to 100°C.

Suitable protonating agents include dilute mineral acid, such as hydrochloric, hydrobromic, or sulfuric acid or aqueous lower alkanoic acid, e.g., having 2 to 4 carbon atoms, such as acetic, propionic or butyric acid, or oxalic acid. Dioxane is a suitable medium, but where the acid employed is suitable as a medium, it may be used in excess to serve as the medium, e.g., aqueous acetic acid.

Compounds II may be obtained by cleavage (process b) of a corresponding butyne ether, i.e., of a compound of formula III:

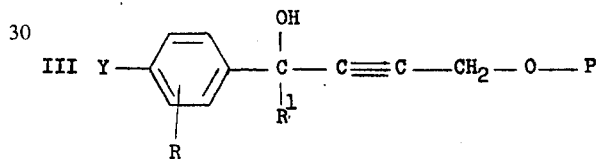

wherein Y, R and $R^1$ are defined above, and P is the residue of a readily-cleaved ether, e.g., tetrahydropyran-2-yl, tetrahydrofuran-2-yl, or 4-methoxy-tetrahydropyran-4-yl, preferably tetrahydropyran-2-yl (THP). Process b) may be carried out in the conventional manner for cleaving a readily-cleaved ether, such as by treatment with aqueous acid hydrolytic conditions.

Process b) may conveniently be carried out at a temperature of, for example, from 40° to 120°C., preferably from 60° to 110°C. An inert, water-miscible organic solvent may also be employed, preferably dioxane. However, water or the aqueous acid, e.g., aqueous acetic acid, employed to create the acid conditions may serve as the solvent. Co-solvents may also be used. The process is suitably carried out under mild acid conditions, i.e., at a pH value of, for example, from 3 to 4. A water-soluble mineral acid, e.g, sulphuric or hydrochloric acid, or a water-soluble organic acid, e.g., p-toluene sulphonic, oxalic or acetic acid, may suitably be used to provide the mild acid conditions.

Compounds III are known and may be prepared as taught in the literature, or where not known may be prepared in a manner analogous to that described for preparing known compounds, e.g., Belgian Patent 792,079. A particularly convenient method for preparing a Compound III, involves reacting a phenyl carbonyl compound of formula IV:

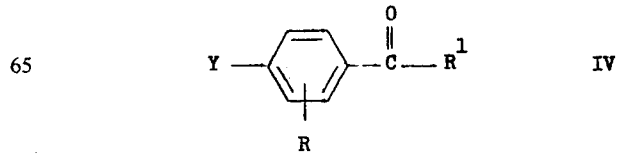

wherein
R, Y and R¹ are as defined above, with an organo-metallo compound of the formula V:

V    D—C ≡ C—CH₂—O—P wherein
P is as defined above; and
D is an equivalent unit of either an active metal or a polyvalent active metal halide, e.g., an alkali metal, such as lithium, potassium or sodium, aluminun, zinc, or magnesium bromide or iodide, to obtain the D salt of the resulting compound III, which on hydrolysis yields the desired compound III. The procedure may be carried out under conditions conveniently employed in carrying out "Grignard-type" reactions, e.g., in an aprotic organic medium at a temperature of from about −30° to 100°C., preferably from about −20°C. to 50°C., followed by standard hydrolysis of the resulting D salt in an aqueous medium, e.g. water or a highly concentrated aqueous salt solution, e.g., saturated ammonium chloride solution. The medium used is dependent upon the composition of the organo-metallo reagent. For example, if D is MgBr, MgI or Li, the medium may be ether or tetrahydrofuran, if D is Na, the medium may be liquid ammonia-ether, liquid ammonia-tetrahydrofuran, dioxane, pyridine or dioxane-pyridine. The temperature and medium are not critical. For example, a Compound III may be prepared by the reaction of a Compound V as a Grignard reagent, with a compound of formula IV, and the subsequent hydrolysis may be carried out in conventional manner. Preferred solvents for such reaction include diethyl ether, tetrahydrofuran, dioxane, benzene and toluene. Preferred temperatures are from −10°C to +90°C., more preferably, from +25°C. to +65°C. It is preferred to exclude moisture from the reaction. The reaction is advantageously carried out under an inert atmosphere, e.g., of nitrogen or argon. The hydrolysis of the resulting salt of a Compound III may conveniently be effected by careful addition to the reaction mixture of water, aqueous sodium sulphate solution, aqueous ammonium chloride solution or dilute acid. The Grignard reagent may be produced in the conventional manner, e.g, by reaction of magnesium and ethyl bromide. The resulting compound III likewise may be isolated in conventional manner.

In the recovery of the resulting Compound III, if acidic conditions are employed, not only will hydrolysis of the D-salt occur, but ether cleavage (process b) can also be accomplished, thus a Compound II can be conveniently obtained, without recovery of the intermediate Compound III.

Compounds Ib, i.e., compounds I in which A is an lower alkanoyl moiety, are obtainable by alkanoylating a Compound Ia, i.e., by process (d). Process (d) may be effected by processes known per se for the alkanoylation or primary alcohols. Suitable alkanoylating agents include lower alkanoic acids, acyl halides and acid anhydrides of formulae A'—OH, A'—Hal and (A')₂O, respectively, wherein A' is an alkanoyl moiety as defined above, and Hal signifies bromine or chlorine, and mixtures thereof. Where the desired alkanoyl moiety is acetyl, a preferred alkanoylating agent is acetic anhydride. In carrying out process (d), inert solvent may be employed or excess alkanoylatig agent may serve as solvent. An acid-binding agent, e.g., pyridine, is preferably used. Preferred temperatures vary between −10° and 50°C.

The preparation of Compounds I by the processes described above, may conveniently be represented by Reaction Scheme A, below, wherein Y, R, R¹, P, D and A' are as defined above.

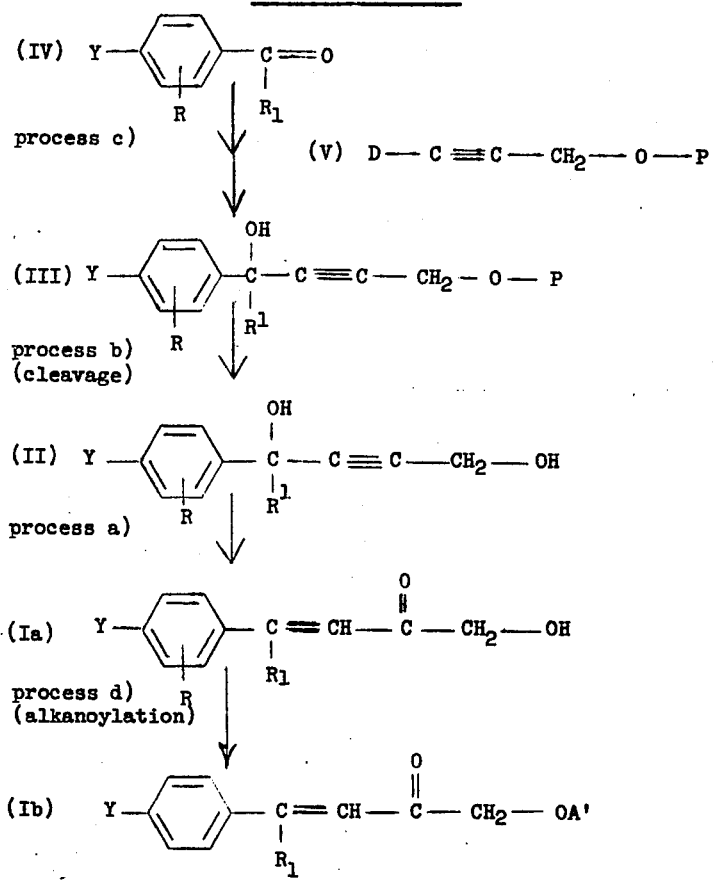

The above-described final products and intermediates may be recovered by conventional methods, such as crystallization or chromatography, e.g, on silica gel preperative plates, as is appropriate to the desired product and reaction mixture containing the desired product. It will be appreciated that due to the double bond between the carbon linked to the aryl moiety and the carbon atom linked to the carbonyl function, cis and trans isomers are possible, and that if desired a product richer in one or the other isomers may be prepared by subjecting a mixture of the isomers to conventional techniques for separating such isomers, such as chromatography, fractional crystallization or countercurrent distribution. The trans isomers are generally preferred.

Reagents and starting materials, e.g., Compounds IV and V, for the above-described processes are known and may be obtained commercially, or prepared as described in the literature, or where not known may be prepared in manner analogous to that described for the preparation of the known materials.

The compounds of formula I are useful because they possess pharmacological activity in animals. In particular, the compounds I are useful as anti-inflammatory agents as indicated, for example, by the Carrageenan induced edema test on rats (oral administration at 5 to 200 mg/kg). For such use, the compounds may be combined with a pharmaceutically acceptable carrier, and such other conventional adjuvants as may be necessary, and administered orally in such forms as tablets, capsules, elixirs, suspensions and the like or parenterally in the form of injectable solutions or suspensions. The dosage administered will, of course, vary depending upon the compounds used and the mode of administration. However, in general, satisfactory results are obtained when administered at a daily dosage of from about 0.5 milligrams to about 200 milligrams per kilogram per os, e.g., from about 1.0 milligram to about 150 milligrams per kilogram, of body weight, given, e.g., in a single dose, in sustained release form, or in divided doses 2 to 4 times a day. For most mammals, the administration of from about 30 milligrams to about 2000 milligrams, e.g., from about 60 milligrams to about 1500 milligrams, of the compound per day provides satisfactory results and dosage forms suitable for internal administration comprise from about 8 milligrams to about 1000 milligrams, e.g., from about 15 milligrams to about 750 milligrams, of the compound in admixture with a solid or liquid pharmaceutical carrier or diluent.

For the above usage, oral administration with carriers may taken place in such conventional forms as tablets, dispersible powders, granules, capsules, syrups and elixirs. Such compositions may be prepared according to any method known in the art for manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparing of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules preferably contain the active ingredient admixed with an inert diluent, e.g., calcium carbonate, calcium phosphate, kaolin, polyethylene glycol, peanut oil or sesame oil. The preferred pharmaceutical compositions from the standpoint of preparation and ease of administration are solid compositions, particularly tablets and solid or liquid diluent-filled capsules.

A particularly valuable compound of this invention is 2-(p-biphenylyl)-2-penten-5-ol-3-one.

The anti-inflammatory activity of certain Compounds I is also exhibited in the adjuvant arthritis test (oral administration 5 to 200 mg/kg) in rats using Mycobacterium butyricum in Freund's adjuvant, e.g, 2-(p-biphenylyl)-2-penten-5-ol-3-one.

Representative formulations for administration, 2 to 4 times a day, in treating inflammation are tablets and capsules prepared by conventional techniques and containing the following:

| Ingredient | Weight in Milligrams | | |
| --- | --- | --- | --- |
| | Tablet | Capsule | Capsule |
| 2-(p-biphenylyl)-2-penten-5-ol-3-one | 100 | 100 | 100 |
| Tragacanth | 10 | | |
| Lactose | 147.5 | 200 | |
| Corn Starch | 25 | | |
| Talcum | 15 | | |
| Magnesium Stearate | 2.5 | | |
| Polyethylene Glycol (M.W. 6000) | | | 200 |

In the following examples which are illustrative of the invention, temperatures are in degrees centigrade, and room temperature is 20° to 30°C., unless indicated otherwise.

EXAMPLE 1

2-(p-Biphenylyl)-2-penten-5-ol-4-one

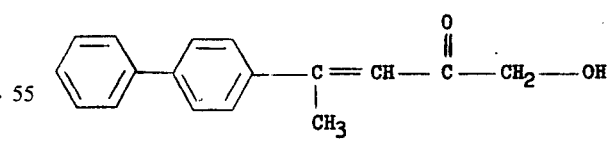

Step A —4-(p-biphenylyl)-1-(tetrahydropyran-2-yloxy)-2-pentyn-4-ol

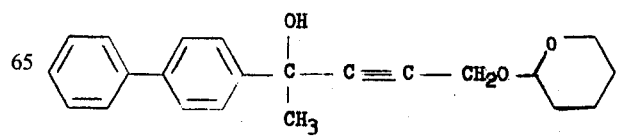

14.6 g (0.6 mole) of magnesium in 80 ml of absolute tetrahydrofuran (THF) is heated to reflux. A few small crystals of iodine and 2 ml of ethyl bromide are added to initiate the reaction. 71.4 g (0.6 mole) of ethyl bromide in 234 ml of abs. THF are then added dropwise while maintaining refluxing. Refluxing is continued for an additional half hour after addition is completed. The reaction mixture is then cooled with an ice bath. 81.2 g (0.58 mole) of 3-tetrahydropyran-2-yloxy -1-propyne in 81,2 ml of abs. THF is then added to the reaction mixture dropwise with stirring at ambient temperatures and then stirring continued at room temperature for one hour after addition is complete. The reaction mixture is then cooled with an ice bath, and 100 g (0.508 mole) of 4-acetylbiphenyl added dropwise with stirring and stirring is continued for 18 hours at room temperature. The reaction mixture is then poured into 1 liter of cold saturated aqueous ammonium chloride. The organic phase is separated. The aqueous phase is extracted twice with 100 ml portions of benzene. The combined organic solutions are washed with 500 ml of 1 N potassium hydroxide and then with 300 ml of water, dried over anhydrous sodium sulfate and then evaporated to dryness to obtain 4-(p-biphenylyl)-1-(tetrahydropyran-2-yloxy)-2-pentyn-4-ol.

Step B—4-(p-biphenylyl)-2-pentyn-1,4-diol

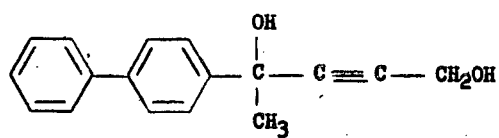

3.0 g of 4-(p-biphenylyl)-1-(tetrahydropyran-2-yloxy)-2-pentyn-4-ol in a mixture of 100 ml of 6N acetic acid and 100 ml of 6N sulfuric acid, is heated at 100°C. for 20 minutes, after which period, the mixture is extracted with chloroform. The organic layer is separated, washed thrice with water, and dried over anhydrous magnesium sulfate, filtered and solvent removed by rotary-vacuum to yield a clear yellow oil which is chromatographed on silica gel preparative plates to give the 4-(p-biphenylyl)-2-pentyn-1,4-diol.

Step C—2-(p-biphenylyl)-2-penten-5-ol-4-one

To 700 mg of 4-(p-biphenylyl)-2-pentyn-1,4-diol in 50 ml of dioxane is added 3 ml of water and 10 drops of concentrated sulfuric acid (85%) causing the solution to turn yellow. The mixture is then stirred at room temperature for 3 minutes, then heated with stirring at 70°C (on a water bath) for 20° minutes, at which time a thin layer chromatography (TLC) test on a sample of the reaction mixture indicates that no diol starting material remains. The reaction mixture is then poured onto crushed ice, and stirred for 30 minutes. The mixture is extracted with chloroform, the organic phase separated and washed twice with water, then dried over anhydrous magnesium sulfate. The filtrate is evaporated to obtain a residue, which is a mixture of cis and trans isomers of the title compound; which mixture consists predominantly of the trans isomer. The mixture is separated by chromatographing on silica gel (preparative plate chromatography) to give refined 2-(p-biphenylyl)-2-penten-5-ol-4-one, (trans), m.p. 115° which also may be designated 4-(p-biphenylyl)-1-hydroxy-3-penten-2-one.

EXAMPLE 2

2-(p-Biphenylyl)-2-penten-5-ol-4-one

Step A—4-(p-biphenylyl)-2-pentyn-1,4-diol

A Grignard reagent is prepared from 7.2 g of magnesium and 33 g of ethyl bromide in 300 ml of dry tetrahydrofuran (THF). To the Grignard reagent is added 37.2 of 3-tetrahydropyran-2-yloxy-1-propyne in 400 ml of dry THF. After 1 hour stirring at room temperature, a solution of 39.2 g of 4-acetyl biphenyl in 200 ml of dry THF is added dropwise and the mixture refluxed 4 hours after addition is completed. The reaction mixture is then allowed to stand at room temperature for 18 hours. The reaction mixture is then poured onto ice, separated and dried over anhydrous magnesium sulfate. The mixture is filtered to remove the drying agent, and solvent removed from the filtrate by evaporation to obtain a residue.

100 ml of 6N acetic acid is added to the residue, then sufficient absolute ethanol is added to dissolve the residue. The solution is heated on a steam bath for 20 minutes. Solvent is removed by evaporation to obtain an oil. The oil is suspended in water, and then extracted with chloroform. The chloroform layer is washed three times with water, then three times with 10% aqueous sodium bicarbonate, then once with saturated sodium chloride (brine). The organic layer is separated and dried over anhydrous sodium sulfate. The solvent is removed by evaporation to obtain an oil which is triturated with warmed ether and 4-(p-biphenyl)-2-pentyn-1,4-diol crystallized therefrom on cooling. The product is then filtered washed with ether/pentane (1:1) and dried (m.p. 99°–101°C.).

Step B—2-(p-biphenylyl)-2-penten-5-ol-4-one

To 6 g of the diol product of Step A, dissolved in 200 ml of dioxane, is added 5 ml of water and 10 drops of concentrated sulfuric acid. The mixture is then heated for 3 hours on a steam bath (about 80°C.). The reaction mixture is then poured onto crushed ice, (about 1 liter) and extracted with methylene chloride. The organic phase is separated, washed four times with water, then once with brine (50 ml portions), dried over anhydrous magnesium sulfate, filtered and the filtrate evaporated on a rotary-vacuum to substantially remove the solvent, leaving crude title produce as a gummy residue, which upon crystallization, yields refined title product, m.p. 115°C.

To a soluton of 0.9 g. of 2-(p-biphenylyl)-2-penten-5-ol-4-one in 75 ml of dry pyridine, 10 ml. of acetic anhydride is added. After 18 hours at room temperature, the mixture is poured onto ice and the solids filtered off and recrystallized from pentane to give 5-acetoxy-2-(p-biphenylyl)-2-penten-4-one, which may also be designated 2-(p-biphenylyl)-2-penten-5-ol-4-one acetate. Repeating this procedure using the appropriate reagents, the corresponding propionate and n-butyrate are accordingly obtained.

Repeating each of the steps of this Example or of Example 1, but replacing the 4-acetylbiphenyl used in each of Steps A, with an approximately equivalent amount of the compound of Column A, there is similarly obtained the compound of Column B:

| A | B |
|---|---|
| a) p-bromoacetophenone; | a) 2-(p-bromphenyl)-2-penten-5-ol-4-one; |
| b) p-t-butyl acetophenone; | b) 2-[p-(t-butylphenyl)]-2-penten-5-ol-4-one; |
| c) 4'-chloro-4-acetyl biphenyl; | c) 2-(4'-chloro-p-biphenylyl)-2-penten-5-ol-4-one; |
| d) 4'-methoxy-4-acetyl biphenyl; | d) 2-(4'-methoxy-p-biphenylyl)-2-penten-5-ol-4-one; |
| e) 2,4-dichloroacetophenone; | e) 2,4-dichlorophenyl)-2-penten-5-ol-4-one; |
| f) 4-propionylbiphenyl; or | f) 3-(p-biphenylyl)-3-hexen-1-ol-2-one; or |
| g) p-isobutyl acetophenone | g) 2-(p-isobutylphenyl)-2-penten-5-ol-4-one. |

What is claimed is:
1. A compound of the formula:

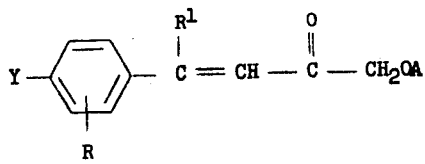

wherein
R is a hydrogen atom or halo having an atomic weight of from about 19 to 80;
$R^1$ is alkyl having from 1 to 3 carbon atoms;
Y is halo having an atomic weight of from about 34 to 80, isobutyl, tert.-butyl, or substituted or unsubstituted phenyl of the formula

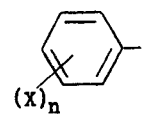

wherein
X is a hydrogen atom, halo having an atomic weight of from about 19 to 80, alkoxy having from 1 to 4 carbon atoms, or alkyl having from 1 to 4 carbon atoms;
n is an integer from 1 to 3; and
A is a hydrogen atom or alkanoyl having from 2 to 4 carbon atoms.

2. A compound of claim 1 whererin A is a hydrogen atom.
3. The compound of claim 2 which is 2'(p-biphenylyl)-2-penten-5-ol-4-one.
4. A compound of claim 2 whrein $R^1$ is methyl.
5. A compound of claim 2 in which Y is substituted or unsubstituted phenyl.
6. A compound of claim 1 wherein A is alkanoyl.
7. A compound of claim 6 wherein $R^1$ is methyl.
8. A compound of claim 1 wherein Y is halo having an atomic weight of from about 34 to 80.
9. A compound of claim 1 wherein Y is isobutyl.
10. A compound of claim 1 wherein Y is tert.-butyl.
11. A compound of claim 1 wherein Y is substituted or unsubstituted phenyl.

* * * * *